June 3, 1958 J. J. HOUGHTON ET AL 2,837,729
MULTI-CHANNEL RECORDER AND REPRODUCER WITH VISUAL PLAYBACK
Filed July 7, 1955 3 Sheets-Sheet 1
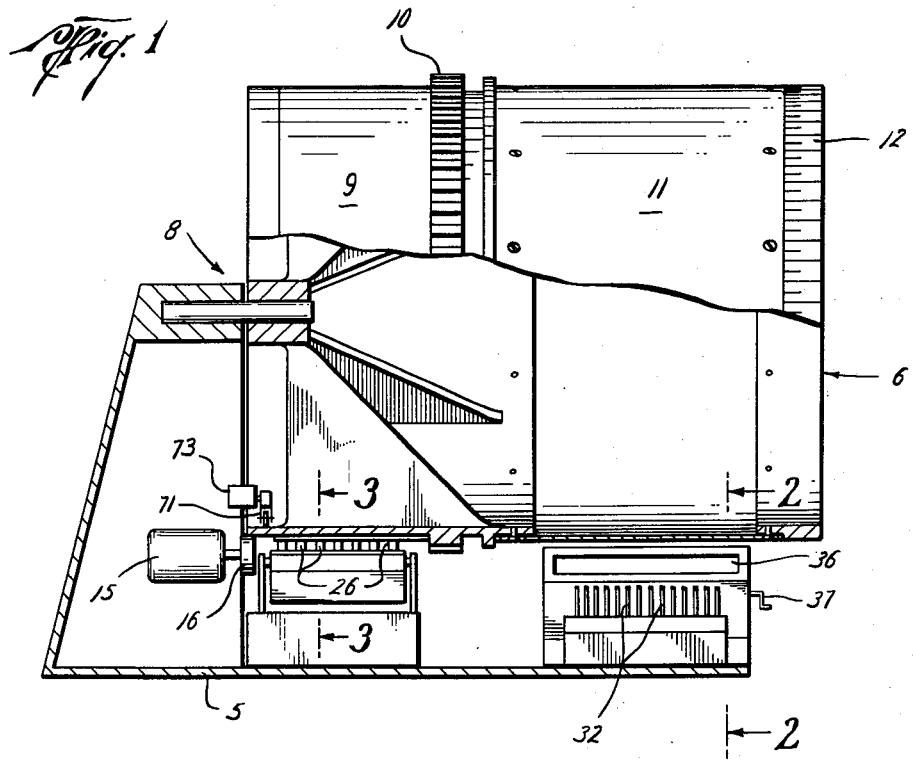
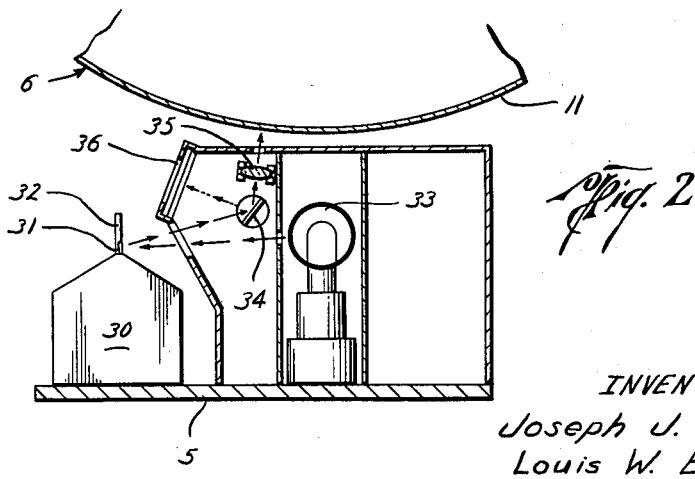
INVENTORS,
Joseph J. Houghton,
Louis W. Erath
BY Thomas O. Arnold
ATTORNEY

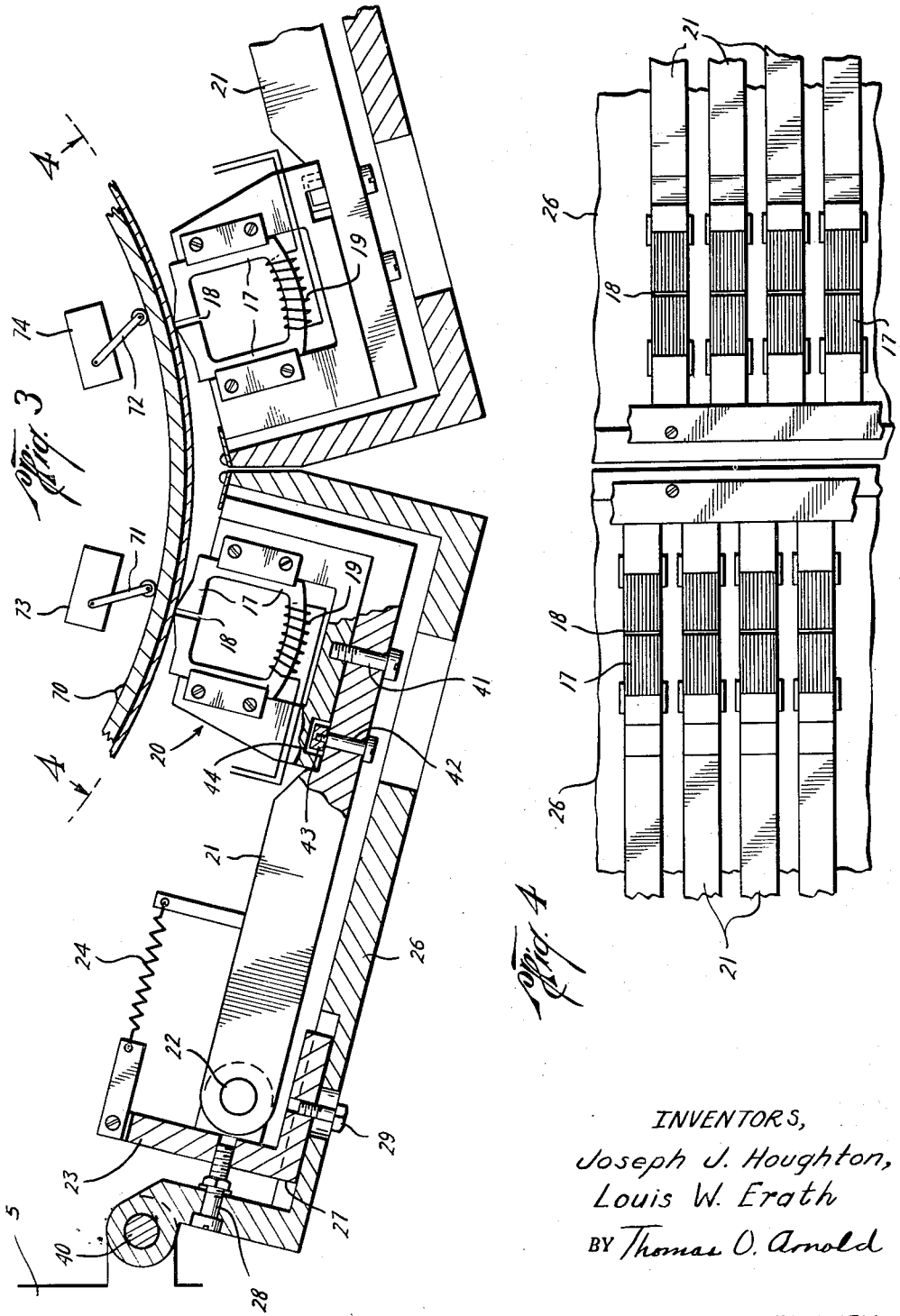

June 3, 1958     J. J. HOUGHTON ET AL     2,837,729
MULTI-CHANNEL RECORDER AND REPRODUCER WITH VISUAL PLAYBACK
Filed July 7, 1955     3 Sheets-Sheet 3

INVENTORS,
Joseph J. Houghton,
Louis W. Erath
BY Thomas O. Arnold
ATTORNEY

_United States Patent Office_

2,837,729
Patented June 3, 1958

2,837,729

MULTI-CHANNEL RECORDER AND REPRODUCER WITH VISUAL PLAYBACK

Joseph J. Houghton and Louis W. Erath, Houston, Tex., assignors, by mesne assignments, to Southwestern Industrial Electronics Company, Houston, Tex., a corporation of Delaware Application July 7, 1955, Serial No. 520,474

8 Claims. (Cl. 340—15)

This invention relates to recording and reproduction devices, and particularly to such devices peculiarily adapted for seismographic uses wherein it is desired to record multiple signals simultaneously and to reproduce them in continuous moving visual form for study.

In seismographic and some other work, it is often desired to record on a single record a group of signals, such as a group of fourteen signals derived from fourteen geophones appropriately positioned in a line at different distances from a shot. It is desired to study the time differentials and amplitude and frequency variations between certain impulses in one signal as contrasted to the other signals. Also, it is often desired to modify the time relationship and amplitude and frequency variations of the signals as they appear in the separate channels on the record, and to study a group of signals together, after their time relationship and amplitude and frequency variations have been altered, as by filtering and mixing. While this invention is equally usable in other applications, there are among the objects of this invention, the satisfaction of these and related problems in seismographic recording work.

Another object of this invention is to provide improved and novel means for recording a plurality of signals.

Still another object of this invention is to provide improved and novel means for visually observing signals which are recorded.

A further object of this invention is to provide an improved and novel combination recorder-playback device wherein the signals recorded can be displaced in their time relationship with each other and can be subjected to amplitude and frequency variations while being continuously observed visually.

Yet another object of this invention is to provide an improved and novel recorder-playback device which permits visual observation of noise or signals to be impressed upon the recording heads prior to the actual recording or playback of information signals.

Yet a further object of this invention is to provide an improved means for photographically recording pictures of selected signals and selected forms of composites of several signals.

Other objects are apparent from the following description and accompanying drawings wherein:

Figure 1 is a schematic representation, partially in section, of a preferred embodiment of the invention.

Figure 2 is an elevational section taken along line 2—2 of Figure 1.

Figure 3 is an elevational sectional view taken along line 3—3 of Figure 1.

Figure 4 is a sectional view, taken along the curved line 4—4 of Figure 3 of the record mounting drum, depicting in particular the arrangement of a group of recording and pickup heads.

Figure 5:
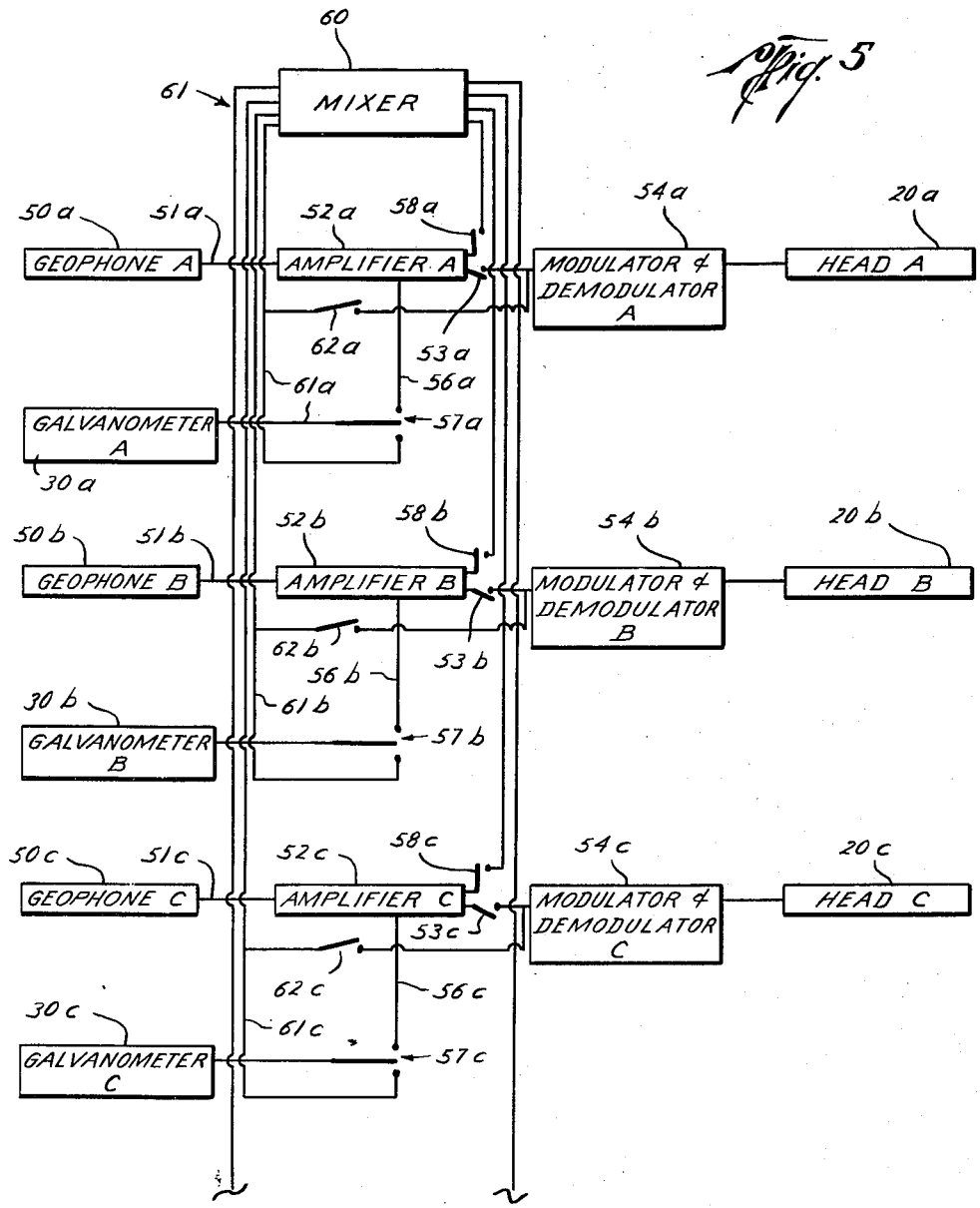
Figure 5 is a schematic view of preferred electrical circuitry of the invention together with typical elements used in conjunction with the invention itself.

Consider first, Figure 1. As in most apparatus of this kind, there is a body or chassis 5 upon which the other parts of the invention are mounted and by which all are positioned in their proper relationship to each other.

In the embodiment of the invention illustrated, there is rotatably mounted upon the chassis 5, a cylindrical drum 6. While there may be bearings at each end of the axis of the drum 6, in the embodiment shown the drum 6 is suspended by a cantilever type construction from a single journal and bearing assembly 8.

Conveniently, the left hand end 9 of the drum may be adapted for the mounting of a magnetic tape record wide enough to receive as many signals as may be desired on different paths or channels. Obviously, other recording means could be used, but magnetic tape is most practical for use in seismographic uses of the instrument.

Adjacent the record mounting end 9 of the drum 6, there may be a hand wheel 10, by which the drum may be conveniently rotated by hand for mounting tapes on the record mounting 9. The hand wheel 10 may be nothing but modest sized gear teeth protruding slightly from the regular drum surface.

The right hand end of the drum is a screen 11, preferably formed of a cylinder of metal, Lucite or glass with a coating of a long persistence phosphor thereon. If desired, the extreme right hand edge of the drum may carry a scale 12.

The term screen, as used herein, may also include the cylinder of metal, Lucite or glass or the like, around which a strip of photographic film may be wrapped for photographic recordation of the signals projected thereon. It is also possible to use both a phosphor and a film on the screen simultaneously.

The preferable arrangement is to mount the film or a light sensitive paper on the inside of a phosphor coated glass cylinder. The phosphor which emits light for visual observation from the outside of the cylinder, also emits light inward toward the film for exposure of a picture of the signal on the film. This particular arrangement suffers the disadvantage that the length of visual observation is determined by the time required for proper exposure of the film. However, the arrangement makes it possible to see what is being photographed without having to wait for development of the photographic film.

It is of some importance to the purposes of this invention that the movement of the record mounting 9 and the screen 11 be synchronized. The synchronization is accomplished in the embodiment illustrated by forming the two elements into a single drum with a single drive means. The two elements are "synchronized" by the structure connecting them. If a different type of record is used, it may be desirable to have the record mounting and the screen separate rather than integral; in such case, the other means for synchronizing the movement of the two elements are provided.

The drum 6, with the record mounting 9 and screen 11, is driven in the preferred structure by means of an electric motor 15 which is mounted upon the chassis 5. There may be appropriate gearing between the motor 15 and the drum 6, but the gears are preferably rubber surfaced rather than toothed gears, so that maximum freedom from vibration and nearly absolute uniform speed can be obtained. In the illustration of Figure 1, the power transmission means is schematically illustrated by a pinion 16 on the shaft of the motor 15, making frictional engagement with the surface of the drum 6 at one edge thereof.

Figures 3 and 4 illustrate the recording and pickup heads which are used in conjunction with a magnetic tape type of record. Each head, itself, is a U of magnetic material 17 with a gap 18 positioned adjacent the record. A coil of wire 19, carrying the signal to be recorded or the signal which has been detected and picked up by the U of magnetic material 17, is wound around a portion of the U 17.

A plurality of heads may be mounted side by side and with the gaps 18 adjacent the record mounting 9, as illustrated in Figures 1 and 3. The recording heads, which are seen only imperfectly in Figure 1, are indicated there by the numeral 20. They are positioned on the under side of the drum 6.

While the recording heads 20 may be mounted by any one of many means, it is desirable in many applications of the invention that they be adjustable. Accordingly, in the embodiment shown in Figure 3, each U 17 is secured to an arm 21. The arm 21 is pivoted at a hinge 22 to an L bracket 23, and is biased by a spring 24 into light continuous contact with the record on the drum 6.

The L bracket 23 is mounted in a head housing 26. Each bracket 23 is positioned in a slot 27 so that the bracket 23 may be moved with respect to the housing 26 in a direction axial of the arm 21. The arm 21 is lined up in a plane perpendicular to the axis of the drum 6, and its permissible movement is also in that plane, and in a direction around the drum 6, thus permitting an advance or retarding of the signal recorded or picked up for alignment purposes.

Means are provided for the simultaneous retraction of all the heads from contact with the magnetic tape or record. Conveniently this function may be accomplished by hinging the housing 26 by a hinge 40 to the chassis 5. The hinge 40 may be a high friction hinge such that the housing 26 will remain in any position to which it is placed. Or the hinge 40 may be a freely movable hinge, and set screw or cam means (not shown) may be used for securing the housing in its alternative positions, one with the heads 20 in contact with the record tape, and the other with the heads retracted from the tape to facilitate each insertion and removal of tape.

The amount of movement of each arm 21 and its corresponding head is controlled by a position screw 28, which moves each bracket 23 forward or backward as the position screw is rotated. Once positioned, a given arm may be secured in position if desired by a set screw 29.

Means are also provided on preferred forms of the invention, for azimuth adjustment of each head. The head 20 may be secured to the arm 21 by a single screw 41, around the axis of which the head may be rotated. Another screw 42 passes through the arm 21 and carries on its end an eccentric or cam 43. The cam 43 is adapted to cooperate with a recess 44 in the head 20 so that when the cam 43 is rotated the azimuth of the head 20 is adjusted.

If it is desired to crowd a large number of recording paths onto a single record, it may be most convenient to mount the recording heads in two banks, as illustrated in Figures 3 and 4, with one bank offset from the other by one-half the distance between heads, as illustrated in Figure 4.

When the device is used for recording, each head 20 is connected to some source of a signal to be recorded, such as a geophone. The circuitry for such connection may be that illustrated schematically in Figure 5 and discussed hereinafter.

Appropriate circuitry, hereinafter discussed, also may connect each head 20 to one of a bank of galvanometers 30 which are positioned below the screen 11. Each galvanometer 30 carries a mirror 31 on a spindle 32 protruding upward therefrom. The galvanometer rotates the spindle 32 in response to signals derived from the pickup head 20 to which the galvanometer is connected.

Consider next, Figure 2. There it may be seen that there is a source of light 33 appropriately screened and positioned to cast light upon each of the mirrors 31 of each of the galvanometers 30. Hence each mirror 31, in its oscillations in response to the signal from a corresponding pickup head 20, sends out a beam of light which is a picture of the subject signal. The beams from all the galvanometer mirrors 31 are directed onto a second mirror 34, which in turn reflects the beams through a lens 35 onto the screen 11.

There is also a second screen 36, positioned in front of the second mirror 34. The second screen 36 may be a simple ground glass panel secured to the chassis 5. The second mirror 34 is rotatable, by a lever 37 (Fig. 1) from its normal position wherein it reflects all the light beams from all the galvanometer mirrors 31 onto the first screen 11, to a second position wherein it reflects all the light beams onto the second screen 36.

A schematic representation of circuitry which may be used with the invention is shown in Figure 5. While Figure 5 shows only a portion of the circuitry, namely that part which may be used with three recording heads, it is indicative of additional circuitry that may be desired or used. In Figure 5, each of the three individual systems have been indicated by the same arabic numerals, the designators for the first system bearing subscripts $a$, the designators for the second system bearing subscripts $b$, and the designators for the third system bearing subscripts $c$.

In Figure 5, the devices originating the signals of interest are geophones 50, three of which ($50a$, $50b$, $50c$) are designated A, B and C in the figure. Each geophone $50a$, $50b$, $50c$ is connected by a line $51a$, $51b$, $51c$ to a geophone amplifier $52a$, $52b$, $52c$. Each amplifier 52 is connectable through a switch $53a$, $53b$, $53c$ to a modulator and demodulator $54a$, $54b$, $54c$, preferably of frequency modulation type. A single block is used in each system to designate both modulator and demodulator, but it is obvious that the equipment designated by the block performs alternatively either as a modulator or demodulator, as the operator desires and not simultaneously as both.

Each modulator and demodulator $54a$, $54b$, $54c$ is in turn connected to a recording head $20a$, $20b$, $20c$, previously described.

Alternatively, output may be taken from each amplifier $52a$, $52b$, $52c$ through a line $56a$, $56b$, $56c$ and a switch $57a$, $57b$, $57c$ to one of the galvanometers $30a$, $30b$, $30c$. Further, alternatively, output may be taken from each amplifier 52 through a switch $58a$, $58b$, $58c$ to a mixer 60.

The mixer 60 may have various outputs, as desired, derived through any one of several output lines 61. One such line $61a$ is connectable alternatively through a switch $62a$ to modulator and demodulator $54a$, or through switch $57a$ to galvanometer $30a$. A second line $61b$ is connectable alternatively through another switch $62b$ to modulator and demodulator $54b$ or through a switch $57b$ to galvanometer $30b$. Still another line $61c$ is connectable alternatively through another switch $62c$ to modulator and demodulator $54c$ or through a switch $57c$ to galvanometer $30c$. And so forth.

Consider various typical outputs of the mixer 60. The output line $61a$ may carry 100% of a signal A, 75% of a signal B, 50% of a signal C; the output line $61b$ may carry 100% of a signal B, 75% of a signal C, 50% of a signal A; and the output of line $61c$ may carry 100% of a signal C, 75% of a signal A, and 50% of a signal B. Other mixtures may be obtained by various adjustments of the mixer 60.

In actual construction, the mixing function is often performed in the amplifier unit, as will be understood by all persons familiar with electronic arts, but the units have been separated in Figure 5 for illustrative purposes.

Also, it should be noted that the amplifiers may, and preferably do, afford opportunity for selective filtering and other modifications of signals passing therethrough. If desired, they may pass or impede, either high, medium or low frequency bands.

Means may also be provided for energizing the heads with the signal from the geophones during and only during a specific time period with respect to a shot.

In the embodiment illustrated, the drum 6 carries on the inside thereof, a bump or cam 70. Hingedly secured to the chassis 5, there are two cam followers 71 and 72, each so positioned as to be moved by the cam 70 once during each revolution of the drum 6. The cam followers 71 and 72 are each adapted to operate a switch 73 and 74, respectively. The first switch 73 and the second switch 74 are operable by the cam 70 in sequence with a slight time lag between the two.

While the circuitry and functioning of the circuitry used with the switches 73 and 74 are only incidental to the invention herein claimed, the switches 73 and 74 are connected in conventional circuits with conventional elements to functions as follows:

When a push button is pressed, the switch 73 operates on the next cycle of the cam 70, to energize the various modulators 54 and make them operative, and to energize other circuits so that when the cam 70 passes the cam follower 72, the switch 74 closes and sets off the shot. The switch 73 is so constructed, however, that upon the second passage of the cam 70 by the follower 71, the modulators are de-energized so that they put out no further signal. Hence, the signals recorded during the first revolution of the drum 6 after the shot are not erased during subsequent revolutions of the drum. Alternative circuits are provided to permit continuous operation of the demodulators during playback operations.

*Operation*

Consider now the operation of the invention in a typical seismographic application. Fourteen geophones, more or less, are set up in a line, spaced apart from each other and from a shot site. Each geophone is conected to one of the recording heads in the invention herein described.

The motor 15 is energized and the drum commences to rotate at uniform speed. Apparently all is in readiness for the shot, but the operator desires to see what kind of spurious responses his geophones may be picking up. He connects each geophone to its respective galvanometer by means of the switch 57, and turns the lever 37 to tilt the second mirror 34 to the position wherein it reflects all the light beams from the galvanometer mirrors 31 to the second screen 36. The operator can then observe whether any of the spots of light appearing on the second screen 36 are unstable, thereby indicating that the corresponding geophone is picking up some kind of noise. When any undesirable condition has been corrected, the switches 57 are opened and the recording heads 20 are connected to the respective geophones through the switches 53.

A push button switch (not shown) is pushed, setting up cam operated switches 73 and 74 for automatic operation to supply the modulators 54 with power for their operation, and immediately thereafter to set off the shot. The signals detected by the geophones are recorded during one revolution of the drum 6. Thereupon, the second operation of the switch 73 by the cam 70 cuts off the operating power from the modulators 54, so that thereafter the recording heads receive no signal whatsoever.

The geophones 50 are disconnected from the amplifiers 52. The galvanometers 30 are connected to receive signals from the pick-up heads 20 through the demodulators 54, switches 53, amplifiers 52 and the switches 57. The drum 6 revolves. Though the writing speed of the light beams from the galvanometers 30 may be great, thereby providing only a weak exposure of the phosphor or film on the screen 11, the signal is projected onto the phosphor or film repeatedly with each revolution of the drum 6, thus building up a bright image of the signal after several revolutions for visual study, or exposing a film adequately to make a clear permanent picture of the signals.

If desired, amplifiers 52a and 52b for example, may be connected through switches 58a and 58b to the mixer 60. The mixer 60 may mix the signals, then pass the mixed signal through the line 61a and a switch 57a to a galvanometer 30a which projects the modified signal for observation. Other mixing may be obtained as previously indicated.

By use of the circuit from the amplifiers and filters 52, the switches 58, mixers 60 and switches 62, the signals from two or more geophones 50 may be filtered as desired and mixed before being fed to the modulator 54 and recording head 20 for recording.

If desired, additional means for adjusting the positions of the recording and pickup heads to vary alignment and timing of signals may be employed. If desired, the galvanometers may be mounted, by cantilever construction, inside the drum 6 so that the light beams pass through the screen 11. If optical recording (on photographic film, for example) is used in place of magnetic recording, the recording head may be a different device from the pickup head, but the two devices, used alternately for their respective operations, perform the recording and pickup functions as a single magnetic recording and pickup head.

It is therefore apparent that modifications may be made in the structure herein described without departure from the scope of the invention. The foregoing description is to be construed as illustrative only, and not as a limitation upon the invention as defined in the following claims.

We claim:

1. A recording and viewing device comprising a recorder-reproducer operable alternatively to record a plurality of varying signals in parallel channels on a movable record member and to translate signals from said channels into a corresponding plurality of electrical voltage signals, a movable screen provided with a phosphor coating operable to luminesce when excited with light energy, a plurality of galvanometers, a mirror for each galvanometer, the position of each mirror being determined by the magnitude of the voltage supplied its galvanometer, means including a light source for directing light energy to the mirrors and from thence to parallel channels on the screen extending along the path of movement, means connecting the recorder-reproducer to the galvanometers in such fashion that signals from different ones of said channels are supplied to corresponding different ones of said galvanometers, and means for moving the record member and the screen in synchronism, whereby signals recorded on the record member may be observed visually at the moment of reproduction.

2. A recording and viewing device comprising a recorder-reproducer, including a rotatable drum operable to carry a magnetic record member, a plurality of magnetic recording-reproducing heads positioned opposite corresponding parallel channels on the record member extending along the direction of movement of the record member, a rotatable cylindrical screen provided with a phosphor coating operable to luminesce when excited with light energy, a plurality of galvanometers, a mirror for each galvanometer, the position of each mirror being determined by the magnitude of the voltage supplied its galvanometer, means including a light source for directing light energy to the mirrors and from thence onto parallel channels extending around the circumference of the screen, means for driving the drum and the screen synchronously, a plurality of sources of varying voltage signals, and means operable alternatively to connect the heads each to a different one of said sources and to connect the heads each to a different one of said galvanometers, whereby the signals may be recorded on the record member and then reproduced and viewed simultaneously on the screen.

3. The apparatus of claim 2 in which said screen is operable to carry a photographic record member so that the signals may be permanently recorded thereon.

4. The apparatus of claim 3, including a second screen and in which said means including a light source further includes a second mirror operable in one position to direct light from the mirrors associated with the galvanometers onto the phosphor-coated screen and in another position to direct light from said mirrors onto the second screen.

5. Apparatus for recording and viewing seismographic signals from a plurality of geophones comprising a rotatable drum operable to carry a magnetic record member along one cylindrical portion of its axial extent, a plurality of magnetic recording-reproducing heads positioned closely adjacent said one portion of the drum and spaced apart axially thereof alternatively to record and pick up signals on and from axially spaced channels on the record member, another cylindrical portion of the drum spaced axially from said one portion operating as a screen and carrying a phosphor-coating operable to luminesce when excited with light energy, a plurality of oscilllographic galvanometers each carrying a mirror whose position is determined by the magnitude of the voltage furnished the galvanometer, means including a light source for directing light energy to the mirrors and from thence onto parallel channels extending around the circumference of the phosphor coating, means for driving the drum, and means operable alternatively to connect the heads each to a different one of the geophones and to connect the heads each to a different one of the galvanometers, whereby the signals may be recorded on the record member and then reproduced and viewed simultaneously on the screen.

6. The apparatus of claim 5, in which said plurality of heads are mounted in a housing, each head being carried by an arm extending perpendicularly with respect to the axis of the drum, a plurality of brackets, one for each arm, each supporting one of said arms and each slidable in a slot in the housing extending parallel to the arms, and means for adjusting the position of each bracket in the slot independently of the others, whereby the heads may be adjusted with respect to each other to obtain a desired time relationship between the signals and the record member.

7. The appartus of claim 6, in which each head is pivotable about its carrying arm and including means for adjusting the azimuthal position of each head with respect to its arm independently of the other heads.

8. The apparatus of claim 5, in which each of said arms is pivotally mounted on its bracket for movement radially of the drum and including spring means between each bracket and its arm urging the arm in such direction as to urge the head toward the drum.

References Cited in the file of this patent

UNITED STATES PATENTS

| | | |
|---|---|---|
| 2,403,997 | Potter | July 16, 1947 |
| 2,424,218 | Begun | July 22, 1947 |
| 2,427,421 | Rieber | Sept. 16, 1947 |
| 2,440,971 | Palmer | May 4, 1948 |
| 2,501,538 | Ruska | Mar. 21, 1950 |
| 2,564,300 | Culver | Aug. 14, 1951 |
| 2,604,955 | Hawkins | July 29, 1952 |
| 2,683,254 | Anderson et al. | July 6, 1954 |